(12) United States Patent
Haikney et al.

(10) Patent No.: US 11,293,495 B2
(45) Date of Patent: Apr. 5, 2022

(54) SELF-LUBRICATING BUSH ASSEMBLY

(71) Applicant: SAFRAN LANDING SYSTEMS UK LTD, Gloucester (GB)

(72) Inventors: Daniel Haikney, Gloucester (GB); Neil Price, Gloucester (GB)

(73) Assignee: Safran Landing Systems UK LTD

( * ) Notice: Subject to any disclaimer, the term of this patent is extended or adjusted under 35 U.S.C. 154(b) by 0 days.

(21) Appl. No.: 16/898,878

(22) Filed: Jun. 11, 2020

(65) Prior Publication Data

US 2020/0392992 A1 Dec. 17, 2020

(30) Foreign Application Priority Data

Jun. 14, 2019 (EP) .................................... 19180250

(51) Int. Cl.
*F16C 41/00* (2006.01)
*F16C 17/12* (2006.01)
*F16C 17/02* (2006.01)
*F16C 33/24* (2006.01)

(52) U.S. Cl.
CPC ............ *F16C 41/002* (2013.01); *F16C 17/02* (2013.01); *F16C 17/12* (2013.01); *F16C 33/24* (2013.01); *F16C 2202/32* (2013.01); *F16C 2350/54* (2013.01)

(58) Field of Classification Search
CPC .......... F16C 17/02; F16C 17/12; F16C 29/02; F16C 33/24; F16C 41/002; F16C 2202/32; F16C 2350/54; F16C 2326/43
See application file for complete search history.

(56) References Cited

U.S. PATENT DOCUMENTS

| | | | |
|---|---|---|---|
| 4,329,780 A * | 5/1982 | Somers | B61F 5/16 |
| | | | 29/846 |
| 4,514,097 A * | 4/1985 | Daly | E21B 10/22 |
| | | | 384/273 |
| 5,908,001 A | 6/1999 | Burke et al. | |
| 6,792,874 B1 * | 9/2004 | Anderson | B61F 5/16 |
| | | | 105/199.4 |
| 2005/0175266 A1* | 8/2005 | Noack | F16C 23/04 |
| | | | 384/277 |
| 2007/0164151 A1* | 7/2007 | Luce | B64C 25/60 |
| | | | 244/100 R |

(Continued)

FOREIGN PATENT DOCUMENTS

EP 3747765 A1 * 12/2020 ............. F16C 33/24
GB 2410986 A 8/2005

(Continued)

OTHER PUBLICATIONS

Extended European Search Report for European Application No. 19 180 250.3, dated Nov. 18, 2019, 8 pages.

*Primary Examiner* — Alan B Waits
(74) *Attorney, Agent, or Firm* — RatnerPrestia

(57) ABSTRACT

A bush assembly configured to be disposed between a first component and a second component movably coupled to the first component, the bush assembly comprising a first bush portion comprising a self-lubricating material; and a second bush portion, the second bush portion having greater electrical conductivity than the first bush portion, wherein the second bush portion provides a conductive path between the first component and the second component.

13 Claims, 7 Drawing Sheets

(56) References Cited

U.S. PATENT DOCUMENTS

2017/0291695 A1* 10/2017 Foster .................. F16C 33/205
2019/0308739 A1* 10/2019 Messina ................ F16C 11/04
2020/0370597 A1* 11/2020 Bell ..................... F16C 33/201
2020/0392991 A1* 12/2020 Mansfield .............. B64D 45/02

FOREIGN PATENT DOCUMENTS

WO     2014137567 A1    9/2014
WO     2017063807 A1    4/2017

* cited by examiner

SELF-LUBRICATING BUSH ASSEMBLY

This application claims priority to European Patent Application No. EP 19180250.3, filed Jun. 14, 2019, which is incorporated herein by reference.

BACKGROUND

An aircraft landing gear assembly can include structural components movably coupled via a coupling or joint. For example, a forward stay includes first and second components that are pivotally coupled to each other using a pin joint to allow the stay to fold. To reduce wear on the structural components as they move relative to each other, bushes are commonly used on the joints.

It is desirable for landing gears to provide a conductive path between the wheels and the landing gear attachment points on the aircraft to enable electrostatic discharges and to ensure protection against lighting strikes. In a pin joint, for example, the conductive path is formed by structural components electrically coupled using the conductive path between the metallic joint bushes and the joint pin.

Recently low-friction materials, commonly known as self-lubricating materials, have been used in joint bushes to reduce the need for periodical greasing of the joint. These self-lubricating materials are generally poor conductors and thus the electrical bonding that was ensured from metal to metal contact between the joint bush, the component and pin is lost.

Bonding straps are one way to provide a current path between coupled components. However, bonding straps require attachment points and fasteners and can cause snagging of other equipment. Furthermore bonding straps can cause excess noise and increase the complexity of the joint leading to a higher maintenance level. It would be desirable to mitigate these issues.

SUMMARY OF THE INVENTION

According to a first aspect of the present invention there is provided a bush assembly configured to be disposed between a first component and a second component movably coupled to the first component, the bush assembly comprising a first bush portion comprising a self-lubricating material; and a second bush portion, the second bush portion having greater electrical conductivity than the first bush portion, wherein the second bush portion provides a conductive path between the first component and the second component.

The second bush portion of the bush assembly may comprise a metallic material, an electrically conductive elastomer, or graphite.

The bush assembly may comprise a third bush portion comprising the self-lubricating material, wherein the second bush portion is located between the first and third bush portions.

The bush assembly may comprise a flange.

The second bush portion of the bush assembly may be configured to exert a force on at least one of the first and second components.

The second bush portion of the bush assembly may be configured to exert a force on at least one of the first and third bush portions.

According to a further aspect of the present invention there is provided a joint assembly comprising a first component, a second component movably coupled to the first component, and a bush assembly according to the above aspect disposed between the first component and the second component, wherein the first component of the joint assembly may be a joint pin and the second component may be pivotally coupled to the joint pin.

According to a further aspect of the present invention there is provided a joint assembly comprising a first component, a second component movably coupled to the first component, and a bush assembly according to the above aspect disposed between the first component and the second component, wherein the first component is a shaft coupled to the second component so that the shaft can move along the longitudinal axis of the shaft.

According to a further aspect of the present invention there is provided an aircraft landing gear assembly comprising one or more of the above joint assemblies.

According to a further aspect of the present invention there is provided an aircraft comprising one or more aircraft landing gear assemblies comprising one or more of the above joint assemblies

BRIEF DESCRIPTION OF THE DRAWINGS

Some embodiments of the present invention will now be described, by way of illustrative example only, with reference to the accompanying Figures, of which.

DETAILED DESCRIPTION OF ILLUSTRATIVE EMBODIMENTS

Figure 1:
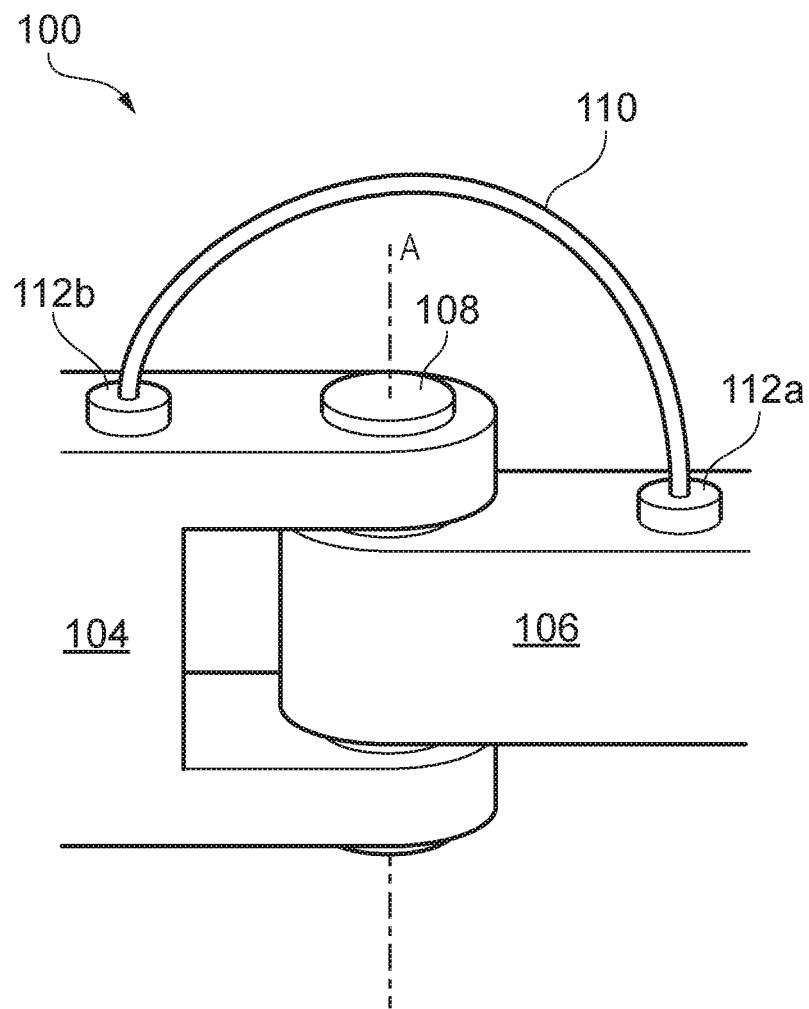
FIG. 1 is a known joint assembly comprising a bonding strap.

FIG. 1 shows two components 104, 106 pivotally connected with a known pin joint 100. The pin joint 100 comprises a joint pin 108 and a self-lubricating bush (not visible in FIG. 1). The longitudinal axis of the joint pin 108 defines an axis A. The pin joint movably couples the first component 104 and the second component 106 such that the first component 104 can move relative to the second component 106 by pivoting about axis A. The first component 104 and the second component 106 can for example be links of a side stay, torque links, lock links, bogie pivot pin, actuator attachments or other similar components commonly found in landing gears. The self-lubricating bush is disposed between the joint pin and the first and second components 104, 106. The self-lubricating bush comprises a low-friction material which reduces or eliminates the need for periodical lubrication of the bush. In other arrangements of known pin joints one of the first and second components 104, 106 may be cross-bolted to the joint pin 108, such that only the other component can move relative to the joint pin 108.

The low-friction material of the self-lubricating bush may be a poor electrical conductor. To ensure that a conductive path exists, through which electrostatic discharges or currents resulting from lighting strikes can flow from the first component 104 to the second component 106, a bonding strap 110 is coupled to the first component 104 though a first strap attachment point 112a to the second component 106 though a second strap attachment point 112b. The bonding strap comprises an electrically conductive material. The attachment points 112a and 112b are configured to enable current to flow from the first component 104 through the bonding strap 110 to the second component 106.

Bonding straps suffer from a number of drawbacks. For example, they can cause snagging of other equipment or can cause the landing gear to 'hang up' during deployment. Furthermore, bonding straps can create excess noise and the attachment points 112 may require bolts and fasteners that can be detrimental to the structural integrity of the components 104, 106. Bonding straps also increase the complexity of the joint assembly and as a result require higher maintenance.

Figure 2:
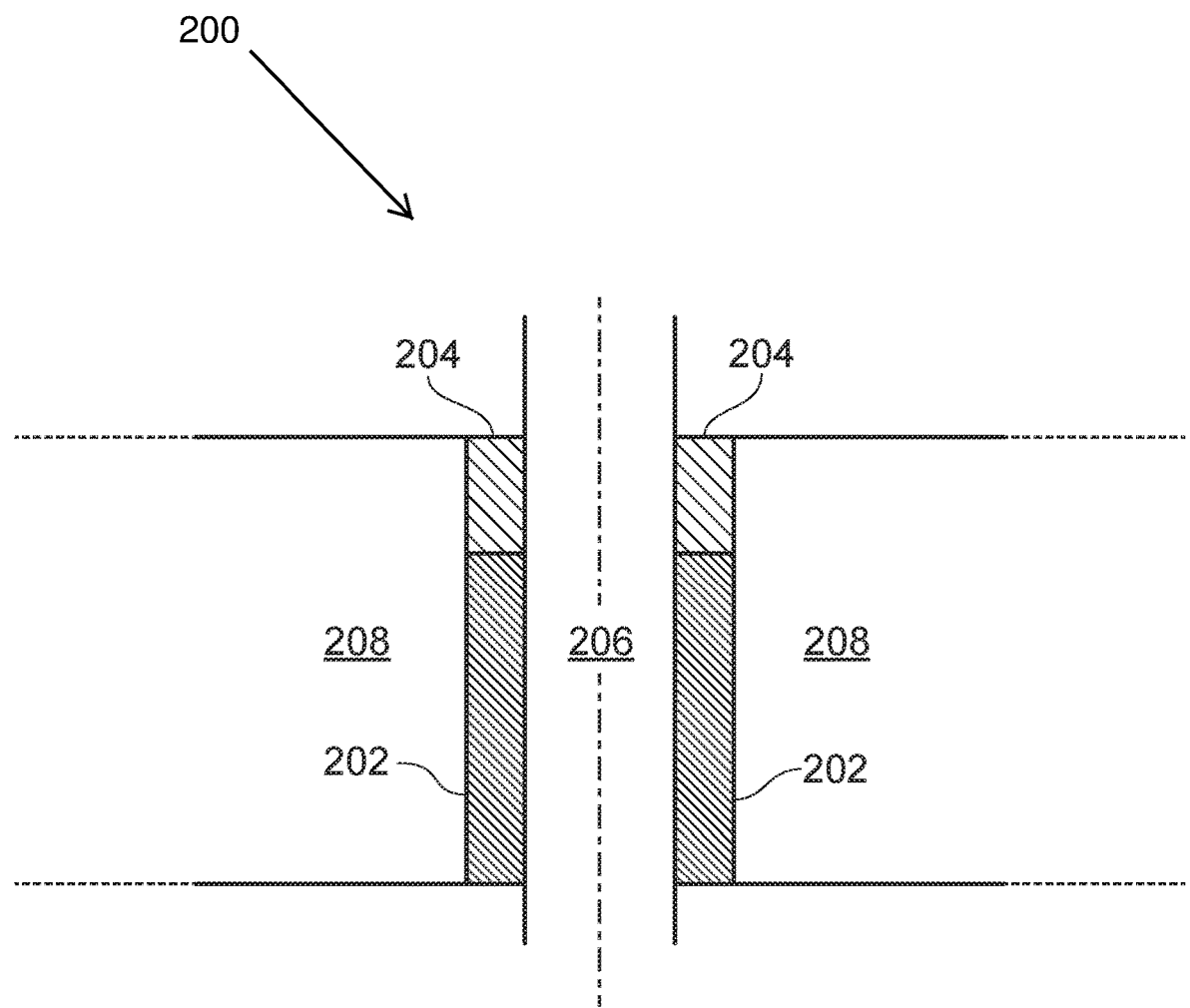
FIG. 2 is a cross-section diagram of a bush assembly according to an embodiment of the invention.

FIG. 2 shows a cross-section of a pin joint assembly comprising a bush assembly 200 according to a first embodiment of the present invention. The bush assembly 200 is disposed between a first component 206 and a second component 208 movably coupled to the first component 206. The first component 206 may be a joint pin. The second component 208 is pivotally coupled to the joint pin and may be any of a side stay, torque link, lock link, shortening link, actuator attachments or the like. The bush assembly 200 comprises a first bush portion 202 and a second bush portion 204. The bush assembly 200 encircles the joint pin. The second bush portion 204 may be a relatively thin ring comprising an electrically conductive material. The second, conductive, bush portion 204 may be arranged, as illustrated in FIG. 2, to be removable and replaceable (when the pin joint is disassembled) by being simply slid off the joint pin. This can be advantageous when, due to wear, the second bush portion may need to be replaced.

The first bush portion 202 comprises a self-lubricating material which is detailed later in the specification. In a preferred embodiment the self-lubricating material may be an electrical insulator. In other embodiments the self-lubricating material may be electrical conductive but having less electrical conductivity than the second bush portion 204.

The second bush portion 204 has greater electrical conductivity than the first bush portion 202 and is arranged to provide a conductive path between the first component 206 and the second component 208. In a preferred embodiment the second bush portion 204 comprises an electrically conductive elastomer or graphite and fully or partially encircles the first component 206. In some embodiments the second bush portion 204 may comprise a metallic material. Thus, the second bush portion 204 electrically couples the first component 206 to the second component 208. In some embodiments the second bush portion 204 may be dimensioned to withstand currents of at least 200kA.

In the embodiment illustrated in FIG. 2 the first bush portion 202 and the second bush portion 204 are in contact and conform to each other such that there is no gap between them. In other embodiments of the invention the first bush portion 202 and the second bush portion 204 may be separated by a gap. The gap may facilitate removing and replacing of the second bush portion as described previously.

In use the joint assembly comprising the bush assembly 200 enables the second component 208 to move relatively to the first component 206 while constantly providing a conductive path for current to flow between the first and second components 206, 208 through the second bush portion 204.

Figure 3A:
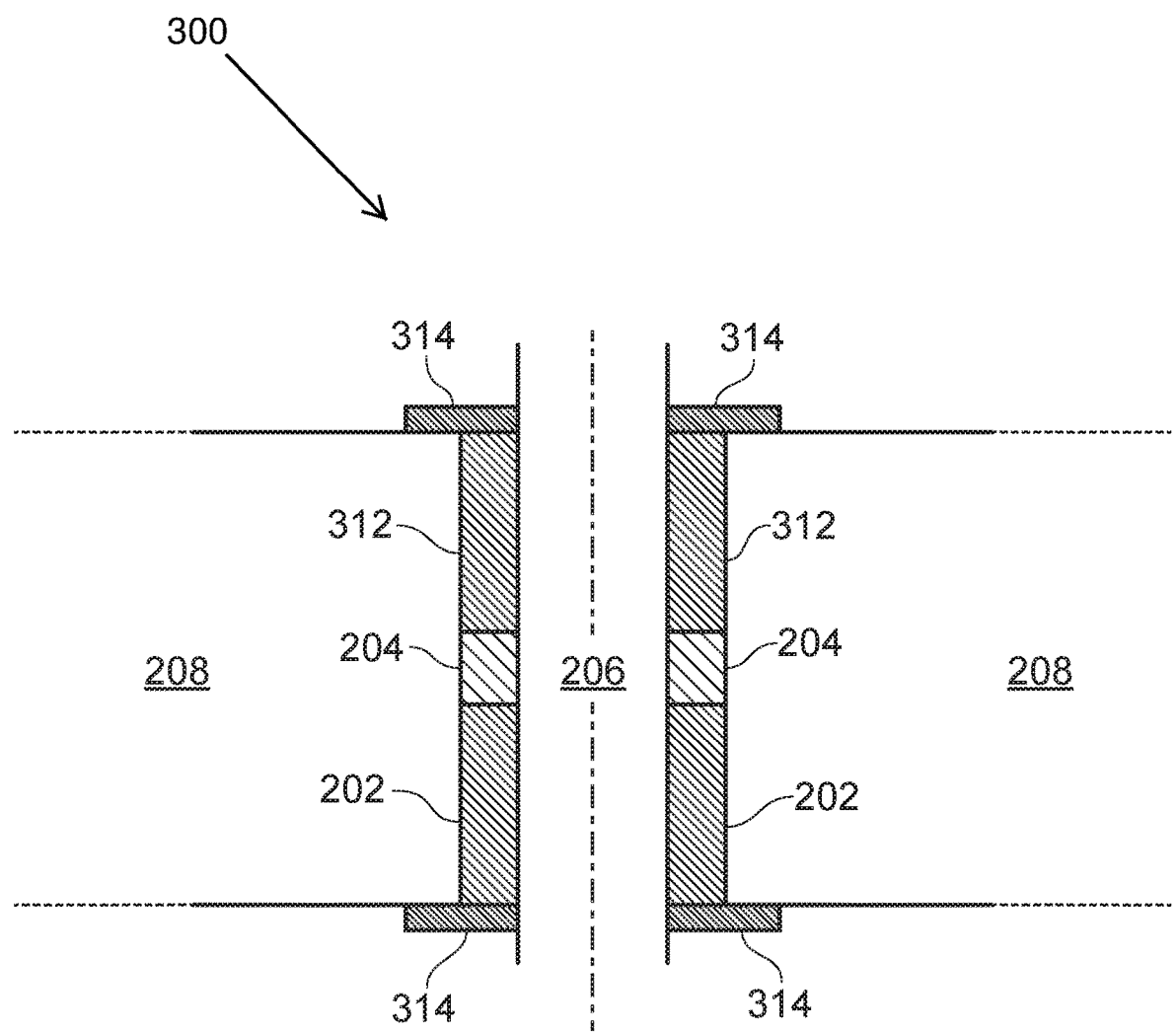
FIG. 3a is a cross-section diagram of a bush assembly according to another embodiment of the invention.

FIG. 3a shows a cross-section of a part of a joint assembly comprising a bush assembly 300 according to a second embodiment of the present invention. The joint assembly of FIG. 3a forms a pin joint in an analogous manner to the joint shown in FIG. 2. The bush assembly 300 comprises a first bush portion 202 of self-lubricating material, a second bush portion 204 of electrically conductive material and a further third bush portion 312. The third bush portion 312 also comprises a self-lubricating material and is arranged so that the second bush portion 204 is located between the first bush portion 202 and the third bush portion 312.

In a preferred embodiment the second bush portion 204 encircles the first component 206 (joint pin) and is in direct contact with the first bush portion 202 and the third bush portion 312 such that the first bush portion 202, the second bush portion 204 and the third bush portion 312 form a substantially tubular bushing disposed between the first component 206 and the second component 208 of the pin joint.

The bush assembly 300 further comprises a flange 314 on an end of one or both of the first and third bush portions 202, 312. The flange 314 comprises a radially extending layer and is arranged to limit the axial travel of the bush assembly 300 relative to the first or second components 206, 208.

Advantageously the bush assembly 300 enables a compact self-lubricating joint assembly that ensures an electrical coupling between structural components of a landing gear. As such it can reduce the need for external bonding straps and fasteners resulting in a joint assembly which may produce less noise, has increased structural integrity and is lighter than known assemblies.

Figure 3B:
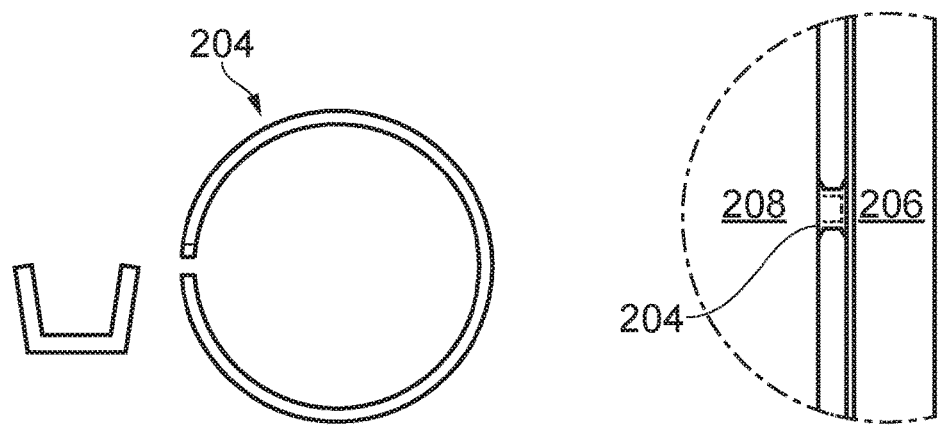
FIGS. 3b-3e are diagrams of possible alternative arrangements of the second bush portion of the bush assembly.

FIGS. 3b-3e show enlarged views of the second bush portion 204. FIG. 3b shows an axially offset view of the second bush portion 204 which is configured to encircle the first component 206. The second bush portion 204 may have a split to allow the second bush portion 204 to adjust to fit the joint pin 206 as shown in FIG. 3b. The cross-section profile of the circumference of the second bush portion 204 may be such that when in use the second bush portion 204 is compressed to fit between the first and third bush portions 202, 312.

Figures 3C, 3D, 3E:
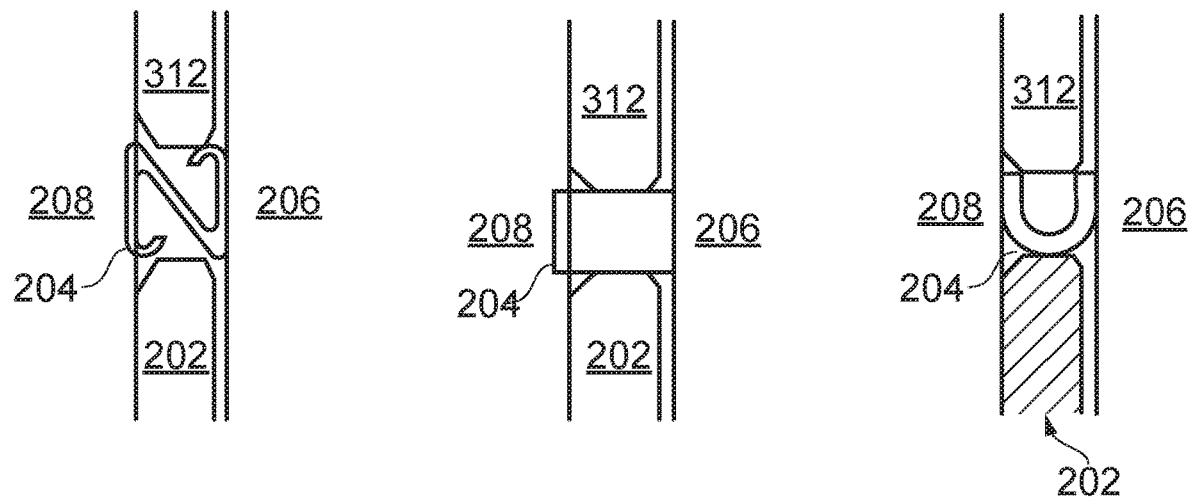

FIGS. 3c-3e show some of the possible alternative cross-section profiles that the second bush portion 204 may have in embodiments of the present invention. The second bush portion 204 may have a circumferential cross-section profile having an "N" shape as shown in FIG. 3c, or "U" shape as shown in FIG. 3e, such that when the second bush portion 204 is compressed it exerts a force on at least one of the first and second components 206, 208 due to the inherent elastic deformation provided by the shaped profiles. In other embodiments of the invention the second bush portion 204 may have a cross-section profile having a "Z" or "C" shape, the second bush portion 204 being configured to exert force on at least one of the neighbouring first and third bush portions 202, 312 by virtue of elastic deformation as explained above. Other embodiments may have a graphite packing washer compressed between the first bush portion 202, the third bush portion 312, the first component 206 and the second component 208 as shown in FIG. 3d.

Figure 4A:
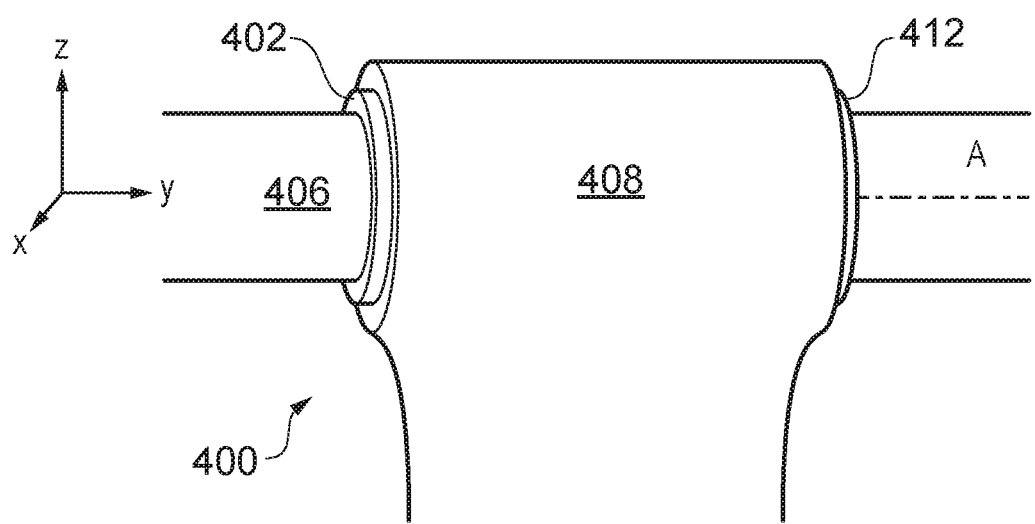
FIG. 4a-4c are diagrams of a bush assembly according to a third embodiment of the invention.
Figure 4B:
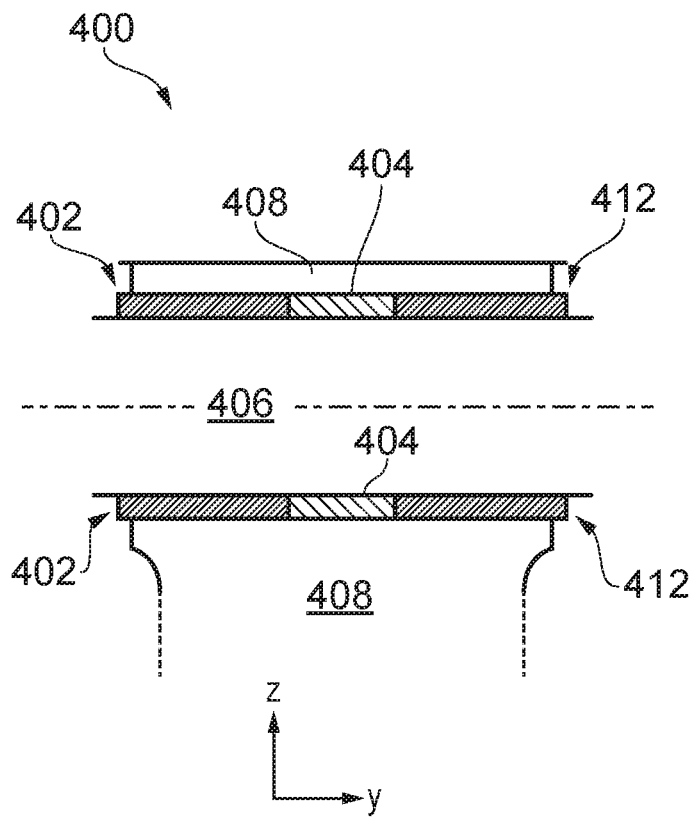
Figure 4C:
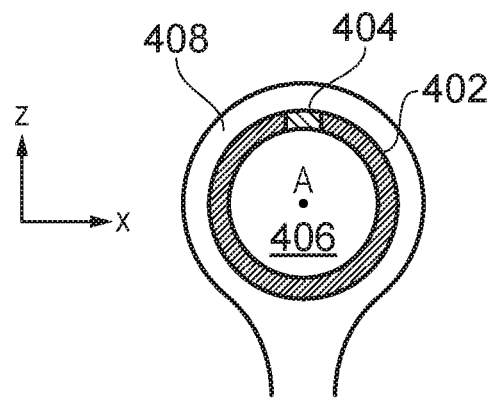

FIG. 4a shows a further embodiment of the present invention, wherein the joint assembly is a sliding joint. The first component 406 is a shaft and coupled to the second component 408 so that the shaft can move along the longitudinal axis of the shaft. Although in FIG. 4a the shaft is shown to be tubular and have a circular cross-section, in other embodiments the shaft can be a geometric prism and have a rectangular, triangular or other polygonal cross-section shape. In FIGS. 4a, 4b and 4c, axis Y is parallel to the longitudinal axis of the shaft, with axis X and Z defining a plane perpendicular to axis Y as shown. The bush assembly 400 comprises at least a first bush portion 402 comprising a self-lubricating material and a second bush portion 404 in an analogous manner to the preceding elements.

FIG. 4b shows one possible arrangement of bush assembly 400, wherein the first bush portion and the second bush portion are axially aligned and arranged to encircle the shaft 406. Preferably but not necessarily, the bush assembly 400 of FIG. 4b further comprises a third bush portion 412 arranged so that the second bush portion 404 is between the first and third bush portion. The second bush portion 404 may have a circumferential cross-section profile of any of the alternatives presented in FIGS. 3b-3e.

FIG. 4c shows another possible arrangement of bush assembly 400, wherein the first bush portion and the second bush portion are not axially aligned. Instead, the second bush portion extends longitudinally in parallel to the shaft, along the Y axis of FIG. 4C. The second bush portion 404 and the first bush portion 402 together form a substantially tubular bush, disposed between the first component 406 and the second component 408.

Figure 5:
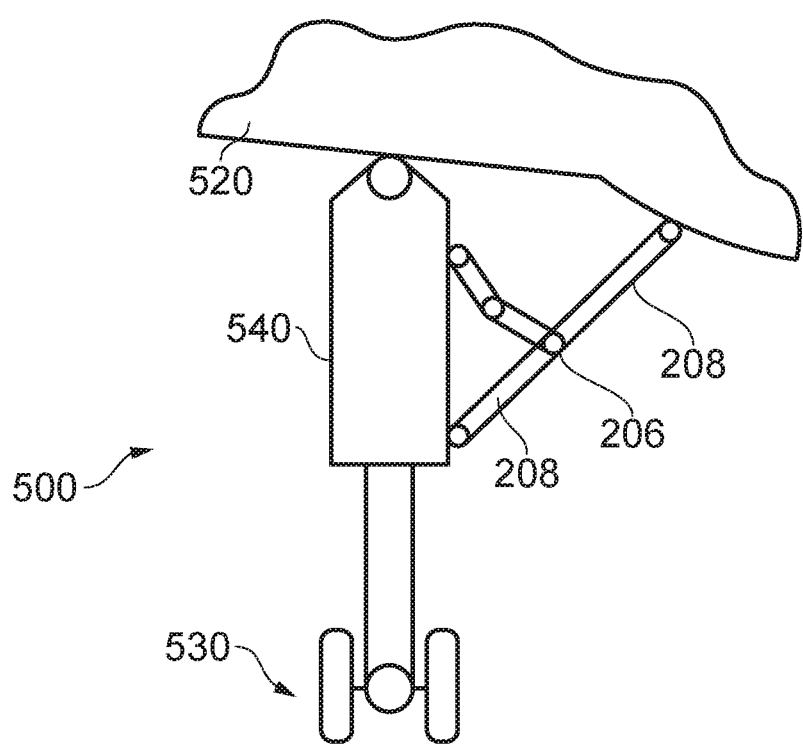
FIG. 5 is a diagram of a partial view of an aircraft with a landing gear assembly comprising an embodiment of the invention.

FIG. 5 shows a partial schematic of an aircraft 520 having a landing gear assembly 500 comprising a main landing strut 540, wheels 530, and at least one joint assembly that comprises the bush assembly of embodiments of the present invention.

The self-lubricating material discussed previously can be a polymer reinforced with synthetic fibres that may comprise continuous fibres such as carbon, aramid, glass, PTFE, polyester, or a combination of them. The self-lubricating material may also comprise epoxy containing particles of dry lubricant, such as graphite, and a continuously woven mix of PTFE fibres and carbon fibres. The skilled person will recognise that the above are just examples and that any material with low-friction properties may be used in their place. The self-lubricating material may be an injected liner on the surfaces of the first and/or third bush portions or the first and/or third bush portions may be machined directly from the material. The self-lubricating material may be bonded on the surfaces of the first and/or third bush portions.

The invention claimed is:

1. A bush assembly configured to be disposed between a first component and a second component movably coupled to the first component, the bush assembly comprising:
  a first bush portion comprising a self-lubricating material; and
  a second bush portion, the second bush portion having greater electrical conductivity than the first bush portion, wherein the second bush portion provides a conductive path between the first component and the second component, and the second bush portion is removable from the first bush portion, and wherein a cross-sectional shape of the second bush provides for elastic deformation.

2. The bush assembly according to claim 1, wherein the second bush portion comprises any of an electrically conductive elastomer, graphite, or a metallic material.

3. The bush assembly according to claim 1, further comprising
  a third bush portion comprising the self-lubricating material, wherein the second bush portion is located between the first bush portion and third bush portion.

4. The bush assembly according to claim 3, wherein the second bush portion is configured to exert a force on at least one of the first bush portion and the third bush portion.

5. The bush assembly according to claim 1 further comprising at least one flange attached to at least one of the first bush portion and the second bush portion.

6. The bush assembly according to claim 1, wherein the second bush portion is configured to exert a force on at least one of the first component and the second component.

7. The bush assembly according to claim 6, wherein the second bush portion is assembled in the bush assembly in a compressed state to thereby generate the force.

8. The bush assembly according to claim 1, wherein the first bush portion and the second bush portion each has a respective inner surface in contact with the first component, and a respective outer surface in contact with the second component.

9. A joint assembly comprising:
  a first component;
  a second component movably coupled to the first component; and
  a bush assembly disposed between the first component and the second component, the bush assembly comprising:
    a first bush portion comprising a self-lubricating material; and
    a second bush portion, the second bush portion having greater electrical conductivity than the first bush portion, wherein the second bush portion provides a conductive path between the first component and the second component, the second bush portion is removable from the first bush portion, and wherein a cross-sectional shape of the second bush provides for elastic deformation.

10. The joint assembly according to claim 9, wherein the first component is a joint pin and the second component is pivotally coupled to the joint pin.

11. The joint assembly according to claim 9, wherein the first component is a shaft, the shaft being coupled to the second component so that the shaft can move relative to the second component along a longitudinal axis of the shaft.

12. An aircraft landing gear assembly comprising one or more joint assemblies according to claim 9.

13. An aircraft comprising one or more aircraft landing gear assemblies according to claim 12.

* * * * *